United States Patent Office 3,769,347
Patented Oct. 30, 1973

3,769,347
PRODUCTION OF d,d'-2,2'-(ETHYLENEDIIMINO) DI-1-BUTANOL HYDROCHLORIDE
John Kazan, Bridgewater Township, Somerset County, N.J., assignor to American Cyanamid Company, Stamford, Conn.
No Drawing. Filed Feb. 11, 1971, Ser. No. 114,725
Int. Cl. C07c 89/00, 89/04
U.S. Cl. 260—584 R  4 Claims

ABSTRACT OF THE DISCLOSURE

Improved quantity and quality of d,d'-2,2'-(ethylenediimino)di-1-butanol dihydrochloride from the reaction of ethylene dichloride and an excess of d-2-amino-1-butanol are obtained by mixing finely divided sodium hydroxide with the reaction mixture, distilling off d-2-amino-1-butanol, adding isopropanol or other 2–4 carbon alkanol, separating sodium chloride, adding HCl, and separating the product.

SUMMARY OF THE INVENTION

This invention relates to improvements in preparing d,d' - 2,2'-(ethylenediimino)di-1-butanol dihydrochloride (ethambutol hydrochloride).

Ethambutol is a therapeutic agent for the treatment of tubercle bacilli infections, particularly human tuberculosis caused by *Mycobacterium tuberculosis*. The compound, its preparation, and its therapeutic use are disclosed in U.S. Pat. 3,176,040, 1965, Wilkinson and Shepherd, see Example 2 thereof. The theareputic activity of the d-isomer is discussed in J. Am. Chem. Soc. 83, 2212 (1961).

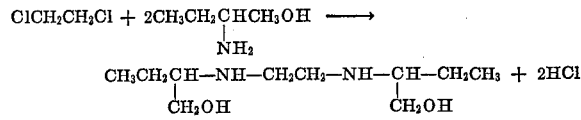

The d,d-form of ethambutol may be made by reacting ethylene dichloride with d-2-amino-1-butanol. During the reaction, hydrogen chloride is produced which reacts with d-2-amino-1-butanol to form a hydrochloride salt. Therefore, at least 4 moles of the amine are used per mole of ethylene dichloride. The ethambutol can be separated as the base, and converted to the dihydrochloride salt.

One method of resolving aminobutanol is disclosed in U.S. 3,553,257, Jan. 5, 1971, Halmos and Ricketts.

By increasing the proportion of d-2-amino-1-butanol, the formation of by-products is depressed, but separation of ethambutol from d-2-amino-1-butanol is a problem.

To produce ethambutol, at a minimum cost to the using public, and with pharmaceutically acceptable purity, including a proper melting point, freedom from ash, proper optical rotation characteristics, and a satisfactory yield, is a problem.

Of the reacting materials, the ethylene dichloride is less expensive than the d-2-amino-1-butanol by more than an order of magnitude. Whereas in most chemical reactions, the least expensive component is added in excess, here for preferred purity, it is necessary that the d-2-amino-1-butanol be added in excess. Because d-2-amino-1-butanol reacts with hydrogen chloride formed, at least 4 moles of d-2-amino-1-butanol is required per mole of ethylene chloride. For better operating efficiency and purity, more than this, up to 16 or more moles, is added.

Because of the cost of the d-2-amino-1-butanol, it is necessary that it be recovered, to have a reasonably priced product.

It has now been found that improved yields and improved purity are obtained by reacting ethylene dichloride with a large excess of d-2-amino-1-butanol; in the order of 1:6 to 1:32 moles are preferred. More of the d-2-amino-1-butanol may be used but the recovery becomes disproportionately more costly without compensating advantages.

The hydrogen chloride formed during the reaction is converted to sodium chloride by the addition of finely-divided sodium hydroxide which converts the amine hydrochloride salts to the corresponding free bases. From the resulting mixture, the unreacted, and hence excess, d-2-amino-1-butanol is distilled, preferably under reduced pressure. Typical conditions are starting at about 80° C. at below 20 millimeters mercury pressure absolute and continuing distillation to about 130° C. with no additional overhead coming over. A 2 to 4 carbon alkanol is added to the distillation residue. Isopropanol is particularly satisfactory because it presents no tax problems such as are connected with the use of ethanol, and no odor problems such as may occur with butanols. Isopropanol is more economical than n-propanol. Sufficient of the alkanol is added so that on heating, the organic materials are dissolved and sodium chloride remains undissolved and is readily removed by filtration.

The filtrate is then treated with hydrogen chloride gas to convert the d-d'-2,2'-(ethylenediimino)di-1-butanol to the dihydrochloride salt and, on cooling, this crystalline material, ethambutol hydrochloride, is readily filtered from the alkanol and is washed with an alkanol, preferably isopropanol, and dried. Depending on impurities which may be present in starting materials, up to about ⅓ of a part of methanol per part of isopropanol and up to about ⅟₁₀ this amount of water may be added to the isopropanol for the separation. Smaller amounts are adequate if only small quantities of impurities are present or less rigorous purifiaction is acceptable. Usually a product is desired having a melting point of at least 198° C. and assay of not less than 99%, an ash content of not more than 0.1% and a specific rotation (10.0% in water) of not less than 6.0°.

The use of sodium hydroxide gives uniquely useful results. Other bases are either not strong enough as a base or less advantageous in solubility or filtration.

The sodium hydroxide added is finely divided with a high surface area. It should be free flowing. Powder and prills of less than 5 mesh per lineal inch, equivalent to a maximum particle size of about 4.0 mm., are satisfactory. A particle size of 3.0 mm. or less is preferred for low ash content in the final product.

Prills are particularly desirable as the particle size is uniform, and rapid dispersion is obtained.

The amount of sodium hydroxide used is sufficient to react with all of the hydrogen chloride present. The sodium hydroxide is added over about 15–20 minutes at a temperature between 80° and 110° C., preferably between 85° and 100° C. The temperature is then maintained between 100° and 125° C., preferably between 110° C. and 115° C., for about 1 hour to permit complete reaction of the hydrogen chloride and the sodium hydroxide.

The reaction mixture is then cooled, and vacuum distilled at a pressure less than 20 mm. and a temperature below about 130° C., starting at a temperature which gives an acceptable distillation rate, until the unreacted d-2-amino-1-butanol has been distilled off, and recovered for subsequent usage.

At the completion of the distillation, the residue is cooled below about 90° C. to prevent flashing, and isopropanol is added. A reflux condenser can control escaping vapors, and return to the reactor. The amount of isopropanol used is between about 3.0 and about 4.0, preferably between 3.3 and 3.6, parts to 1 part of the ethambutol base in the distillation residue. The mixture is then maintained at a temperature above 50° C., preferably a temperature of about 70–75° C., but not above reflux, until solution is complete, about 30 minutes. The solution is filtered, advantageously, at a temperature between about 50° and 65° C., to remove sodium chloride and any other insoluble materials which may be present. An additional amount of isopropanol, about ⅕ part per part of isopropanol in the distillation residue, is used to wash the filter cake.

For best results, the combined filtrate and washings are treated with diatomaceous earth and refiltered at 40–45° C. through a fine filter.

To the clear solution is added sufficient hydrogen chloride gas to convert all of the d,d'-2,2'-(ethylenediimino)-di-1-butanol to the dihydrochloride salt, plus a small excess. Conveniently, the hydrogen chloride is introduced over the surface of the solution in a closed vessel while maintaining a pressure of about 5–7 p.s.i.g. in the vessel. During the addition of hydrogen chloride, the temperature should be maintained below about 55° C.

The solution is slowly cooled over about 2 hours to about 30° C. It should test acid to Congo Red indicator paper. The crystalline precipitate of ethambutol hydrochloride is separated by filtration, conveniently, but not necessarily, at a temperature of 27–30° C. The crystals are washed with isopropanol, and are dried at a temperature below about 80° C.

Obviously centifugation or other solid liquid separation procedure may be used instead of filration, if plant equipment therefor is more conveniently available, at any step where solid liquid separation is desired.

The invention is illustrated by the following example in which parts are by weight unless otherwise clearly indicated.

EXAMPLE I

A mixture of 4620 g. of d-2-amino-1-butanol and 320 g. of ethylene dichloride is heated to 80° C. and the temperature is allowed to rise exothermally to about 130° C. After 1 hour, the mixture is cooled to about 95° C., 225 g. of sodium hydroxide is slowly added, and a temperature of about 112° C. is maintained for 1 hour. The sodium hydroxide is in the form of prills of about 4 mm. diameter. The mixture is cooled to 70° C. and unreacted d-2-amino-1-butanol is recovered by vacuum distillation. The distillation is at a pressure below 20 mm. mercury, and below 130° C., heat being applied at a rate within the capacity of the condenser.

Isopropanol (2900 g.) is added to the distillation residue at a temperature not above about 90° C., and followed by a refluxing period of 30 minutes. The mixture is cooled to and filtered at 60° C. to remove sodium chloride, and the filter cake is washed with 470 g. of isopropanol, at 60° C. The volume of the filtrate is diluted to 4300 ml. with isopropanol and the temperature is adjusted to 40–45° C., 15 g. of diatomaceous earth filter aid is added, and a second filtration is carried out.

To the clear filtrate there is added 1200 g. of methanol and 150 g. of water. The vessel is closed and hydrogen chloride (about 250 g.) is introduced over the surface of the charge at a gas pressure of 5–7 p.s.i.g., while the temperature is allowed to rise to 55° C., to a pH of 2 to 2.5. The charge is cooled very slowly to 28° C. and is stirred for about 1 hour.

Conveniently, a small aliquot is titrated, and a calculated quantity of hydrogen chloride added. Proper final pH is confirmed by testing as acid to wet Congo Red test paper. Other methods of measuring the pH can be used. The white crystalline product, d,d'-2,2'-(ethylenediimino)-di-1-butanol dihydrochloride is separated by filtration, and washed with isopropanol. The product, carefully dried at a maximum temperature of 75° C., is about 700 g., has a decomposition range of 198.5–204° C. and an ash content of 0.1%.

This is a pharmaceutically acceptable, elegant grade of ethambutol hydrochloride without further treatment or refinement. The product may be tabletted or encapsulated by conventional procedures.

I claim:

1. In the process for preparing d,d'-2,2'-(ethylenediimino)di-1-butanol dihydrochloride by reacting liquid ethylene dichloride with liquid d-2-amino-1-butanol to form a mixture consisting essentially of d,d'-2,2'-(ethylenediimino)di-1-butanol, d-2-amino-1-butanol and the hydrochloride salts thereof, the improvement which comprises:
    (1) mixing an excess of d-2-amino-1-butanol, such as to serve as solvent as well as reactant and being at least about 6 moles of d-2-amino-1-butanol per mole of ethylene dichloride, with ethylene dichloride, and causing the mixture to react,
    (2) adding to the thus formed mixture consisting essentially of d,d'-2,2'-(ethylenediimino)di-1-butanol, excess d-2-amino-1-butanol and the hydrochloride salts thereof, sufficient finely divided sodium hydroxide to react with the hydrogen chloride present to form sodium chloride,
    (3) distilling off and thereby separating the unreacted d-2-amino-1-butanol from the mixture,
    (4) adding a 2 to 4 carbon alkanol, thereby forming a solution of d,d'-2,2'-(ethylenediimino)di-1-butanol in said alkanol,
    (5) separating the sodium chloride from the solution, said sodium chloride being undissolved,
    (6) adding hydrogen chloride gas to the resulting solution to form d,d'-2,2'-(ethylenediimino)di-1-butanol dihydochloride, and precipitate the same, and
    (7) separating said precipitate of d,d'-2,2'-(ethylenediimino)di-1-butanol dihydrochloride from the said alkanol.

2. The process of claim 1 in which the distillation of unreacted d-2-amino-1-butanol is under reduced pressure, and the distilled d-2-amino-1-butanol is recycled to the process in a subsequent batch.

3. The process of claim 2 in which the lower alkanol is isopropanol.

4. The process of claim 3 in which the sodium hydroxide is free flowing and less than about 5 mm. particle size.

References Cited

UNITED STATES PATENTS 3,579,587    5/1971    Zoja _____ 260—584 R
3,176,040    3/1965    Wilkinson _____ 260—584 RX LEWIS GOTTS, Primary Examiner R. L. RAYMOND, Assistant Examiner